Aug. 26, 1924.
R. C. BENNER
1,506,216
STORAGE BATTERY VENT
Filed Feb. 2, 1922
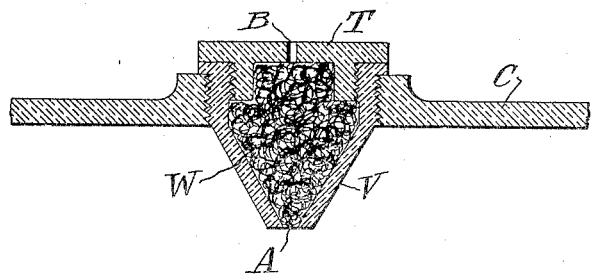
Inventor:
Raymond C. Benner,
by Byrnes, Townsend & Brickenstein,
Attorneys.

Patented Aug. 26, 1924.

1,506,216

UNITED STATES PATENT OFFICE.

RAYMOND C. BENNER, OF BAYSIDE, NEW YORK, ASSIGNOR TO THE PREST-O-LITE COMPANY, INC., OF NEW YORK, N. Y., A CORPORATION OF NEW YORK.

STORAGE-BATTERY VENT.

Application filed February 2, 1922. Serial No. 533,715.

*To all whom it may concern:*

Be it known that I, RAYMOND C. BENNER, a citizen of the United States, residing at Bayside, in the county of Queens and State of New York, have invented certain new and useful Improvements in Storage-Battery Vents, of which the following is a specification.

This invention relates to storage battery vents and particularly to an improved vent especially adapted to prevent the creeping and spraying of the electrolyte but permitting the escape of gas.

The success of some types of storage cells, especially those used in portable electric lighting devices such as flashlights, depends to a considerable extent on the prevention of leakage of the electrolyte. Accordingly, an important object of this invention is to provide a vent that will provide an outlet for the escape of gas generated within the cell but which will intercept electrolyte that might otherwise be carried out with such escaping gas, and which will also prevent creepage of electrolyte out through such vent.

The above and other objects and the novel features of the invention will be apparent from the following description taken in connection with the drawing which is a view of a portion of a storage cell embodying this invention.

Fibrous material, such as glass wool, has heretofore been used in the gas outlet passages of storage batteries for the purpose of retarding the leakage of electrolyte therefrom but has not been effective in preventing the creeping out of the acid. Generally speaking, the object of the invention is attained by inserting, in the gas outlet passage of the vent, a mass of fibrous acid-resisting material the fibers of which have been coated with an electrolyte-repellent substance, such as a film of oil or other oleaginous substance. An oily film on glass wool effectively prevents creepage of the acid. While the invention is advantageously applied to miniature storage cells, it will be understood that it may be applicable with satisfactory results to other types of cells.

The drawing illustrates a portion of a storage cell, the member C being the cover or other part of the cell which carries the vent and vapor arrester V. The vent tightly fits in an opening in the cover C and may be of any preferred shape and, as herein shown, the same comprises an inner conical part that has a passage A which communicates with the space above the electrodes and electrolyte, as is well known. The vent may have a top T which is desirably removable so that electrolyte may be introduced into the cell through the vent. The top T has an outlet passage B through which gas may escape after it passes through the vent. The parts described are desirably of suitable acid-resisting material, such as hard rubber, celluloid or the like.

The gas generated in the cell carries electrolyte vapor and bubbles with it as it passes into the vent V. In order to arrest the vapor and prevent spraying caused by bursting bubbles, a mass of suitable fibrous acid-resisting material W is placed in the vent. The fibers are desirably of material, such as glass wool, which is also non-conducting, but lead fibers and similar acid-resisting electrically conductive fibrous material may be employed. The glass wool or other fibrous material is desirably in a loose condition in the vent and its fibers constitute a large number of baffles which will intercept and break the gas bubbles carrying electrolyte but prevent the spraying thereof, the arrested liquid returning to the main body of electrolyte through the opening A.

It has been found that glass wool and other fibrous substances heretofore used in vents have not entirely prevented the creepage of the electrolyte out of the vent, because the electrolyte wets the surfaces of the glass fibers and in time the acid creeps out of the cell. In the arrangement disclosed in the present invention, the fibrous material, desirably before it is introduced into the vent or gas outlet passage, is treated with oil or other suitable oleaginous substance to form an oily or electrolyte-repellent film on the fibers adapted to repel the acid or other electrolyte and prevent any creepage thereof out of the gas outlet passage. The fibrous material may be coated with an oily film in a number of ways, for example, the mass of glass wool may be dipped in a bath of hot oil, such as ordinary lubricating oil, and after removal therefrom, the excess oil may be drained off or blown off, leaving a relatively thin coating of oil adhering to the fibers upon cooling. A solution of oleaginous substance, such as a solution of petrolatum in gasoline, may be employed instead of a bath of hot oil, the solvent being evaporated after dipping, leaving a thin film of oily substance on the fibers. Oily substances, especially oils, greases and waxes that congeal at ordinary temperatures, are desirably employed to form the electrolyte-repellent film on the fibers. In general, a substance that will provide an acid-repellent surface or film on the fibers or filaments may be employed as a coating substance. Electrolyte carried into the vent by the escaping gases will be arrested by the baffling action of the fibers, which prevent spraying, and the acid-resisting coating will not be wetted, thus preventing creepage of the acid.

While the improved vent is shown and described in detail it will be understood that various changes may be made therein without departing from the spirit of the invention disclosed or sacrificing any of its advantages.

I claim:—

1. A vent having an outlet passage containing fibrous acid-resisting material coated with electrolyte-repellent substance.

2. A storage battery vent having a gas passage containing fibrous acid-resisting non-conducting material coated with electrolyte-repellent substance.

3. A storage battery vent having a gas outlet passage containing fibrous acid-resisting material coated with oleaginous substance.

4. A storage battery vent having a gas passage containing glass wool coated with acid-repellent substance.

5. A storage battery vent having a gas outlet passage containing glass wool coated with oleaginous substance.

6. A storage battery vent having a gas outlet passage containing glass wool, the fibers of which are coated with oil.

In testimony whereof I affix my signature.

RAYMOND C. BENNER.